United States Patent
Kishimoto et al.

(10) Patent No.: US 6,399,527 B1
(45) Date of Patent: *Jun. 4, 2002

(54) GLASS COMPOSITION AND SUBSTRATE FOR INFORMATION RECORDING MEDIUM

(75) Inventors: Shoichi Kishimoto; Akihiro Koyama; Junji Kurachi; Nobuyuki Yamamoto, all of Osaka (JP)

(73) Assignee: Nippon Sheet Glass Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,126

(22) Filed: Sep. 22, 1999

(30) Foreign Application Priority Data

Sep. 22, 1998 (JP) ............................................. 10-268359

(51) Int. Cl.⁷ ............................ C03C 3/085; C03C 3/087
(52) U.S. Cl. ...................... 501/69; 501/70; 428/694 ST
(58) Field of Search ................ 501/69, 70; 428/694 ST

(56) References Cited

U.S. PATENT DOCUMENTS

| | | | | |
|---|---|---|---|---|
| 4,746,578 A | * | 5/1988 | Kondo et al. | 501/64 |
| 4,839,313 A | * | 6/1989 | Kondo et al. | 501/64 |
| 4,891,336 A | * | 1/1990 | Prassas | 501/13 |
| 5,300,467 A | * | 4/1994 | Ishizaki et al. | 501/67 |
| 5,561,089 A | * | 10/1996 | Ishizaki et al. | 501/69 |
| 5,900,296 A | * | 5/1999 | Hayashi et al. | 501/69 |
| 5,902,665 A | * | 5/1999 | Kuroda | 501/69 |
| 5,997,977 A | * | 12/1999 | Zou et al. | 428/694 ST |
| 6,333,286 B1 | * | 12/2001 | Kurachi et al. | 501/69 |
| 6,340,647 B1 | * | 1/2002 | Koyama et al. | 501/69 |

FOREIGN PATENT DOCUMENTS

| JP | 11302031 | * | 11/1999 |
|---|---|---|---|
| JP | 11302032 | * | 11/1999 |

\* cited by examiner

*Primary Examiner*—Karl Group
(74) *Attorney, Agent, or Firm*—Sughrue Mion, PLLC

(57) ABSTRACT

A glass composition having a high Young's modulus and a low density is disclosed which can be mass-produced by a continuous process and easily made to have high surface smoothness. Also disclosed are a substrate including the glass composition and reduced in bending and resonance even upon high-speed rotation, a recording medium usable at a lower flying height, and an information recording device having a higher recording capacity and a shorter access time. The glass composition includes, in terms of mol %, 40 to 55% silicon dioxide ($SiO_2$), 0.5 to 6% aluminum oxide ($Al_2O_3$), 2 to 20% lithium oxide ($Li_2O$), 0 to 10% sodium monoxide (($Na_2O$), 2 to 30% $R_2O$ ($R_2O=Li_2O+Na_2O$), 5 to 25% magnesium oxide (MgO), 0 to 25% calcium oxide (CaO), 0 to 10% strontium oxide (SrO), 10 to 40% RO (RO=MgO+CaO+SrO), 0 to 10% titanium dioxide ($TiO_2$), and 0 to 5% zirconium oxide ($ZrO_2$).

15 Claims, No Drawings

GLASS COMPOSITION AND SUBSTRATE FOR INFORMATION RECORDING MEDIUM

FIELD OF THE INVENTION

The present invention relates to a glass composition having a high elastic modulus, more particularly a glass composition which is suitable for use as an information recording medium substrate required to have excellent surface smoothness, a high elastic modulus, and a low specific gravity and is easy for mass production. The present invention further relates to an information recording medium substrate, an information recording medium, and an information recording device each comprising the glass composition.

BACKGROUND OF THE INVENTION

A larger and larger recording capacity and a shorter and shorter access time are required to information recording devices such as magnetic disks. One possible way to realize the latter requirement is to rev up the spinning speed of an information recording medium (hereinafter referred to simply as "recording medium").

However, since substrates for information recording media (hereinafter referred to simply as "substrates") are bent down by their own weight, and the distortion makes substrates resonate considerably when a higher spinning speed is employed. Such a vibrational resonance causes a fatal crash of recording media by a collision between the medium and magnetic head. This is the reason why the narrow gap between a magnetic head and a recording medium cannot be employed when using a current substrate (hereinafter, the magnetic head/recording medium gap is referred to as "flying height"), and this prevents information recording devices from increasing their recording capacity.

In order to reduce bending and resonance of substrates, we should use substrates whose elastic modulus represented by Young's modulus is higher than that of conventional substrates (hereinafter, this elastic modulus is referred to simply as "Young's modulus"). The aluminum alloy which has been most commonly used as the substrates of magnetic disks has a Young's modulus of 71 GPa and cannot cope with high spinning speeds of 10,000 rpm and above. Although there is a need to use thinner substrate for device miniaturization, the aluminum substrates need to have a larger thickness so as to cope with such high rotational speeds.

Substrates made of a tempered glass have a higher Young's modulus than that of such aluminum substrates. For example, a glass substrate made of a commercially available soda-lime glass tempered by immersing into a molten potassium salt for ion-exchange is on the market. This substrate has a Young's modulus of 72 GPa. Furthermore, a substrate comprising glass ceramics whose a Young's modulus is 90 GPa is also on the market. However, this glass ceramics substrate has residual crystal grains at the surface after surface polishing because the glass ceramics contains precipitated crystals inside. Namely, this glass ceramics substrate has a large drawback accompanied with the tempered glass substrates at a standpoint of surface smoothness after surface polishing.

JP-A-10-81542 (the term "JP-A" as used herein means an "unexamined published Japanese patent application") discloses a glass which is based on $SiO_2$—$Al_2O_3$—RO (wherein R is a bivalent metal) and contains at least 20 mol % $Al_2O_3$, at least 20 mol % MgO, and from 0.5 to 17 mol % $Y_2O_3$. Furthermore, JP-A-10-81540 discloses a glass having a glass transition point of 750° C. or higher, while JP-A-10-79122 discloses a glass based on $SiO_2$—$Al_2O_3$—RO (wherein R is a bivalent metal) and containing $TiO_2$, $ZrO_2$, $Y_2O_3$, etc. However, since these glasses basically contain no alkali ingredients, they cannot be tempered by ion exchange,. and as a result, they do not have a sufficient breaking strength.

International Publication Wo 98/55993 discloses various glasses having a Young's modulus represented by Young's modulus of 100 GPa or higher and a liquidus temperature of 1,350° C. or lower and a substrate obtained by forming any of these glass compositions with a mold. However, the forming process using a mold where molten glass is formed to products basically one by one, seen in production of bottles or cups, is unsuitable for mass production. In addition, such glass compositions, whose a liquidus temperature is 1,350° C., are difficult to vitrify, and it is exceedingly difficult to mold these glasses by a continuous process, e.g., a float process.

In future improvements in information recording devices, improvements in substrates with higher spinning speed and thinner thickness become more important. Moreover, since the amount of stored information is growing larger and larger with the progress of an information-oriented society, there is a social demand for a substrate and a recording medium of inexpensive and high performance.

SUMMARY OF THE INVENTION

Accordingly, an object of the present invention is to provide a glass composition which has a high Young's modulus and a low density and suitable for mass production by a continuous process and is easy to obtain high surface smoothness.

Other objects of the present invention are to provide a substrate comprising the glass composition and reduced in bending and resonance even upon high-speed rotation, to provide a recording medium usable at a lower flying height, and to provide an information recording device having a higher recording capacity and a shorter access time.

The present invention has been achieved in view of the problems and requirements of the prior art techniques described above. Specifically, the present inventors have carried out intensive investigations on relationships between the contents of components and properties including Young's modulus in aluminosilicate glasses. The glass system whose properties will be described below is found as the fruits of the investigations.

The present invention provides a glass composition comprising, in terms of mol %, 40 to 55% silicon dioxide ($SiO_2$), 0.5 to 6% aluminum oxide ($Al_2O_3$), 2 to 20% lithium oxide ($Li_2O$), 0 to 10% sodium monoxide ($Na_2O$), 2 to 30% $R_2O$ ($R_2O$=$Li_2O$+$Na_2O$), 5 to 25% magnesium oxide (MgO), 0 to 25% calcium oxide (CaO), 0 to 10% strontium oxide (SrO), 10 to 40% RO (RO=MgO+CaO+SrO), 0 to 10% titanium dioxide ($TiO_2$), and 0 to 5% zirconium oxide ($ZrO_2$).

Preferred modes of the glass composition of the present invention are as follows:

the glass composition comprising, in terms of mol %, 45 to 55% silicon dioxide ($SiO_2$), 0.5 to 5% aluminum oxide ($Al_2O_3$), 10 to 20% lithium oxide ($Li_2O$), 2 to 6% sodium monoxide ($Na_2O$), 15 to 26% $R_2O$ ($R_2O$=$Li_2O$+$Na_2O$), 10 to 17% magnesium oxide (MgO), 0 to 7% calcium oxide (CaO), 2 to 8% strontium oxide (SrO), 12 to 24% RO (RO=MgO+CaO+SrO), 0.5 to 5% titanium dioxide ($TiO_2$), and 0 to 2% zirconium oxide ($ZrO_2$);

the glass composition wherein the ratio of the content of $Li_2O$ to that of $(Li_2O+Na_2O)$ in terms of mol % is from 0.75 to 0.95;

the glass composition wherein the ratio of the content of MgO to that of (MgO+CaO+SrO) in terms of mol % is from 0.35 to 0.85;

the glass composition wherein the ratio of the content of $(Li_2O+Na_2O)$ to that of (MgO+CaO+SrO) in terms of mol % is 0.90 or larger;

the glass composition wherein the ratio of the content of $Al_2O_3$ to that of $(Li_2O+Na_2O)$ is 0.25 or smaller;

the glass composition which virtually contains neither yttrium oxide ($Y_2O_3$) nor any rare-earth oxide;

the glass composition which contains virtually no CaO;

the glass composition whose liquidus temperature is 1,200° C. or lower;

the glass composition whose elastic modulus as represented by Young's modulus is 95 GPa or higher and whose density of 3.0 g/cm$^3$ is lower;

the glass composition which can be easily polished to obtain optically polished surface with free abrasive grains, the rate of polishing, which is represented in terms of thickness reduction per unit time by polishing, is not lower than that of soda-lime glasses; and the glass composition which is experienced an ion exchange treatment by immersing into a molten salt containing at least either of potassium ions and sodium ions.

The present invention further provides a process for forming a molten glass of the above glass composition using a float process.

The present invention furthermore provides a substrate for information recording media which is made of the above glass composition.

The present invention still further provides an information recording medium employing the above substrate.

The present invention still further provides an information recording device employing the above information recording medium.

DETAILED DESCRIPTION OF THE INVENTION

Modes for carrying out the present invention will be explained below in detail. Hereinafter, all percents are by mol percents (mol %).

$SiO_2$ is the essential component constituting the network structure of the glass. The silica glass consisting of $SiO_2$ alone has a Young's modulus of about 70 GPa, while general soda-lime silicate glasses (having an $SiO_2$ content of about 70%) have a Young's modulus of 72 GPa. In order to obtain a glass whose Young's modulus is higher than such glasses, $SiO_2$ content of the glass should be reduced, specifically 55% or lower. The glass of $SiO_2$ contents exceeding 55% results in Young's modulus lower than 95 GPa. On the other hand, too low $SiO_2$ contents arouse troubles, for example, that the glass cannot retain its network structure and liquidus temperature of such glass is undesirably high. Specifically, a glass whose $SiO_2$ content is lower than 40% has so high liquidus temperature and poor chemical durability. In addition, viscosity of the melt of such a glass is so low that it is difficult to form the molten glass into glass by any continuous process. Consequently, the content of $SiO_2$ in the glass composition of the present invention should be from 40 to 55%, and is preferably from 45 to 55%.

$Al_2O_3$ is an ingredient which improves the Young's modulus of the glass, increases the thickness of a compression stress layer formed by ion exchange process, and improves the water resistance of the glass. If the content of $Al_2O_3$ is lower than 0.5%, these effects are insufficient. On the other hand, if the content thereof exceeds 6%, viscosity of the glass and liquidus temperature increase rapidly, and melt ability is markedly spoilt. Consequently, the content of $Al_2O_3$ in the glass composition should be from 0.5 to 6%, and is preferably from 0.5 to 5%.

Furthermore, if the proportion of $Al_2O_3$ to all alkali ingredients $R_2O$ ($Li_2O+Na_2O$), i.e., $Al_2O_3/R_2O$, is larger than 0.25, the liquidus temperature of the glass increases abruptly, resulting in poor melt ability. Consequently, $Al_2O_3/R_2O$ is preferably 0.25 or lower.

$Li_2O$ is an essential ingredient which not only decreases the melting temperature of the glass and also improves the Young's modulus thereof. And during tempering treatment, $Li^+$ ions are exchanged to improve the glass strength. Moreover, $Li_2O$ makes easy to obtain mirror surface to accelerate the rate of mirror polishing. At the point of views listed above, higher content of $Li_2O$ is desired. Specifically, the content $Li_2O$ is preferably 2% or higher, more preferably 10% or higher. If the content of $Li_2O$ is lower than 2%, Young's modulus of the glass is lower than 95 GPa and an amount of exchanged ions is so insufficient that breaking strength of resultant glass does not improve. On the other hand, $Li_2O$ terminates the network structure constituted of network former like $SiO_2$, etc. The glass whose $Li_2O$ content exceeds 20% has an unnecessarily high liquidus temperature, and weatherability and acid resistance of the glass are undoubtedly deteriorated. Consequently, the content of $Li_2O$ in the glass composition should be from 2 to 20%, and is preferably from 10 to 20%.

$Na_2O$ is an ingredient which improves the Young's modulus of the glass and lowers the melting temperature and liquidus temperature thereof to enhance meltability, and during tempering treatment, $Na^+$ ions are exchanged. $Na_2O$ further makes it easy to get smoothly polished surface to speed up the rate of mirror polishing like $Li_2O$. However, $Na_2O$ is less effective than $Li_2O$ in the point of improving Young's modulus and is hence an optional ingredient. If the $Na_2O$ content is higher than 10% in the glass composition, the Young's modulus decreases and the weatherability and acid resistance thereof abruptly become worse. Consequently, the content of $Na_2O$ in the glass composition should be 10% or lower, and is preferably from 2 to 6%.

If the content of all alkali ingredients $R_2O$ ($R_2O=Li_2O+Na_2O$) is lower than 2%, meltability of the glass is unacceptably bad, and the total amount of exchanged ions is insufficient during a tempering treatment. On the other hand, if the content thereof is higher than 30%, the weatherability and acid resistance of the glass decrease abruptly. Consequently, the content of $R_2O$ should be from 2 to 30%, and is preferably from 15 to 26%.

A further limitation on the alkali ingredients is as follows. If the proportion of $Li_2O$ to the all alkali ingredients $R_2O$, i.e., $Li_2O/R_2O$, is smaller than 0.75, Young's modulus of the glass becomes unacceptably low. If the proportion is bigger than 0.95, the weatherability and acid resistance of the glass abruptly become worse. Consequently, the proportion of $Li_2O/R_2O$ is preferably from 0.75 to 0.95.

MgO is the most important essential ingredient and is a network-modifying oxide in the glass. MgO is highly effective to improve the Young's modulus of the glass, is also effective to decrease the density of the glass, and is good for better meltability. If the content of MgO is lower than 5%, these effects are insufficient. If the content thereof exceeds 25%, the glass has an unfavorably high liquidus temperature and devitrification resistance of such glass becomes worse. Consequently, the content of MgO in the glass composition should be from 5 to 25%, and is preferably from 10 to 17%.

CaO, like MgO, is an ingredient which makes it easy to melt the glass and improves the Young's modulus thereof. However, at a viewpoint of Young's modulus, CaO is less effective than MgO. If the content of CaO is higher than 25%, the glass becomes to devitrificate easily. Consequently, the content of CaO in the glass composition should be 25% or lower, and is preferably 7% or lower. Especially when the glass contains SrO as one of the ingredients, the content of CaO is more preferably practically zero, specifically below 1%.

SrO, like MgO and CaO, is an ingredient to improve the meltability of the glass. However, since SrO is heavier than MgO and CaO, a glass containing too much SrO has an undesirably high specific gravity. Consequently, the content of SrO in the glass composition should be 10% or lower, and is preferably from 2 to 8%. When SrO coexists with MgO, it improves the stability to devitrification of the glass magically. Consequently, it is strongly recommended to be contained SrO in the glass at least in a small amount, specifically in an amount of 0.1% or more.

If the total content of all alkaline earth ingredients RO (RO=MgO+CaO+SrO) is lower than 10%, Young's modulus of the glass is lower than 95 GPa, and the meltability of the glass is poor. As the content of RO increases, the Young's modulus increases. However, if the content of RO is higher than 40%, liquidus temperature of the glass is unacceptably high, the molten glass is apt to be devitrificated when cooling for solidification, and it is difficult to obtain a homogeneous glass product. Consequently, the content of RO in the glass composition should be from 10 to 40%, and is preferably from 12 to 24%.

Furthermore, if the proportion of MgO to RO, i.e., MgO/RO, is lower than 0.35, Young's modulus of the glass is undesirably low. On the other hand, if the proportion is higher than 0.85, the liquidus temperature of the glass increases rapidly and the devitrification resistance thereof abruptly becomes worse. Consequently, the proportion of MgO/RO is preferably from 0.35 to 0.85.

If the proportion of $R_2O$ to RO, i.e., $R_2O$/RO, is lower than 0.90, the glass has an unacceptably high liquidus temperature and poor devitrification resistance. Consequently, the proportion of $R_2O$/RO is preferably 0.90 or higher.

$TiO_2$ is an ingredient highly effective to increase the Young's modulus of the glass and to improve the weatherability thereof. Though it is an optional ingredient, $TiO_2$ is hence preferably contained in an amount of 0.5% or larger. On the other hand, the glass which contains too much $TiO_2$ becomes milky. Consequently, the content of $TiO_2$ in the glass composition should be 10% or lower, and is preferably from 0.5 to 5%.

$ZrO_2$, like $TiO_2$, is an optional ingredient which is effective to increase the Young's modulus of the glass and is good to improve the weatherability thereof. However, note that $ZrO_2$ has the effect to enhance crystallization of the glass because there is the fact that it is frequently used as a nucleating agent for glass ceramics. Consequently, the content of $ZrO_2$ in the glass composition should be 5% or lower in order to prevent the liquidus temperature from being unacceptably high and to secure devitrification resistance. The content thereof is preferably 2% or lower.

Besides the ingredients described above, other ingredients can be contained in the glass. The total amount of "the other ingredients" up to 3% and the purposes of then are coloring, clarification of molten glass, etc. Examples of such optional ingredients include $As_2O_3$, $Sb_2O_3$, $SO_3$, $SnO_2$, $Fe_2O_3$, CoO, $CeO_2$, Cl, and F. However, it is favorable that $Y_2O_3$ or any of the oxides of the rare earth elements (the elements called lanthanide and ranging in atomic number from 57 to 71) should not be contained virtually in the glass composition, because these ingredients are expensive and the specific gravity of the glass composition becomes higher than acceptable.

The term "not contained virtually" means that no means is taken to add those ingredients purposely. The above term is not intended to exclude the glass composition which contains a small amount of such ingredients, for example, coming from impurities contained in ordinary starting materials.

The glass composition can be formed by any of forming techniques such as pressing, down-draw, and float processes because its good moldability. The optimal way among these is the float process because it is suitable for mass production and is capable of yielding a glass plate having high surface flatness.

This glass composition can be also easy to polish to obtain optical polished surface. Because of this, when this glass is employed, it is possible to cut the time for optical polishing, and it is possible to improve productivity for each application. The feature of the glass of the present invention is strikingly clear when substrates for information recording media (hereinafter referred to simply as "substrates") are made from glass. The optical polishing process herein means, for example, a treatment in which an abrasive fluid prepared by suspending an abrasive material comprising, e.g., cerium oxide ($CeO_2$) as the main component in water is dropped onto a surface of the work and the surface is rubbed with a felted fabric. The rate of polishing, which is represented by decrease of thickness per unit time, of this glass is almost equal to or higher than that of the soda-lime silicate glasses generally on the market as float-processed sheet glass.

WO 98/55993 discloses a glass whose liquidus temperature is 1,350° C. or lower and a glass article obtained by press-molding of this glass with a mold. However, glasses whose liquidus temperature is 1,350° C. or higher are quite sensitive to devitrificate. It is therefore extremely difficult to obtain such glasses without devitrification in large scale production. Especially such glasses disclosed above are apt to devitrify undesirable during press molding process, resulting from temperature distribution in the molten glass in the mold. In contrast, the glass composition of the present invention, comprising the ingredients and contents of each ingredient specified above, has a liquidus temperature of 1,200° C. or lower and has enough stable to keep its quality. Moreover, the glass composition of the present invention has less tendency to devitrificate even in press molding process with a mold.

Since this glass composition contains $Li_2O$ and $Na_2O$, $Li^+$ and $Na^+$ ions in glass can easily be exchanged by immersing into a molten salt containing at least either of potassium ions and sodium ions. The resultant ion-exchanged layer generates a compression stress on the surface of the glass and improves breaking strength of the glass. In need of higher strength, chemical tempering treatment is, therefore, preferred to the glass.

Young's modulus of this glass composition is 95 GPa or higher and a density is 3.0 g/cm³ or lower. Hence, the glass is hard and lightweight and is useful for various applications, This glass composition is useful for all of current applications, including building materials and substrates, without particular limitations. Especially when used as substrates, the glass composition has excellent effects that the substrates resist to bend and are hard to resonate.

In the hard disk drives widely used currently as information recording devices, the substrate is spun at a revolution speed of from 4,000 to 10,000 rpm and the distance between the magnetic head and surface of the substrate (flying height) is 10 nanometers or so. Since it is evident that in the future, higher and higher substrate rotational speed and smaller and smaller flying height should be employed for such hard disk, higher and higher the Young's modulus and rigidity of the substrates should become crucially important from the standpoint of going along quality requirements of the next generation. Rigidity herein means the value represented by "Young's modulus/density". The higher the rigidity of a substrate is, the more effective it is to reduce the load to spin the substrate and to reduce the power consumption of the drive. When substrates whose Young's modulus is 95 GPa or higher and whose density is 3.0 g/cm$^3$ or lower are used, the same flying height as the current one can be employed even at rotational speed up to 10,000 rpm and higher.

To make the glass into a substrate, processes for producing conventional glass substrates can be used as they are. Consequently, high-performance substrates can be easily produced from the glass composition at low cost because no equipment investment is newly necessary. Also in processing these substrates into information recording media, conventional production processes can be used as they are.

The present invention will be explained below in more detail by reference to Examples and Comparative Examples, but the invention should not be construed as being limited to these Examples in any way.

EXAMPLES 1 TO 15

Common raw materials for glass including silica, alumina, lithium carbonate, sodium carbonate, basic magnesium carbonate, calcium carbonate, potassium carbonate, strontium carbonate, titania, and zirconia were mixed together to prepare batches so as to result in the compositions shown in Table 1. Each batch prepared was melted at 1,350° C. for 4 hours in a platinum crucible and then poured on an iron plate. This glass was held at 550° C. for 30 minutes in an electric furnace. Thereafter, the furnace was switched off to allow the glass to slowly cool to room temperature. Thus, sample glasses were obtained.

The density, Young's modulus, and liquidus temperature of each sample glass were measured or calculated in the following manners. The results obtained are shown in Table 1.

[Measurement of Density and Young's Modulus]

Each sample glass was cut into a piece and each side thereof was subjected to mirror polishing to obtain a platy sample having dimensions of 10×30×30 mm. Each sample was examined for "density" by the Archimedes method. Furthermore, the "Young's modulus" of each sample was calculated by the ultrasonic pulse method (in conformity with Japanese Industrial Standard, JIS R 1602-1986) using a sing-around oscillator.

[Measurement of Liquidus Temperature]

Each sample glass was pulverized, held in a temperature-gradient electric furnace for 2 hours, and then taken out of the furnace. The highest temperature at which devitrification was observed within the glass was taken as the liquidus temperature.

[Measurement of Rate of Polishing]

Using an Oscar type polishing apparatus, the mirror surface of each of the above platy samples was polished for a given period of time with an abrasive fluid prepared by suspending an abrasive material comprising cerium oxide as the main component (trade name, Cerico SG; manufactured by Shin Nippon Kinzoku Kagaku Co., Ltd.) in water. From the resultant weight loss, the amount of the glass removed by the polishing per unit time was calculated. A general soda-lime silicate glass produced by the float process was also used to prepare therefrom a platy sample of the same size, and this sample was polished under the same conditions. This value of rate of polishing for the soda-lime silicate glass was used as a reference value to determine the "rate of polishing" for each Example as a relative value. The results obtained are shown in Table 1. The soda-lime glass used as a reference corresponds to Comparative Example 3 which will be given later.

TABLE 1

| | Example | | | | | | | | | |
|---|---|---|---|---|---|---|---|---|---|---|
| Item | 1 | 2 | 3 | 4 | 5 | 6 | 7 | 8 | 9 | 10 |
| $SiO_2$ | 52.0 | 47.8 | 50.7 | 51.4 | 50.7 | 51.0 | 54.0 | 47.0 | 45.0 | 51.0 |
| $Al_2O_3$ | 3.3 | 4.0 | 3.2 | 2.2 | 3.2 | 3.0 | 3.0 | 4.0 | 5.0 | 4.0 |
| $Li_2O$ | 17.3 | 15.9 | 19.9 | 17.5 | 16.9 | 17.0 | 13.0 | 20.0 | 19.0 | 16.2 |
| $Na_2O$ | 4.2 | 3.9 | 2.1 | 5.3 | 4.1 | 4.0 | 4.0 | 2.0 | 6.0 | 3.3 |
| $K_2O$ | 0.0 | 0.0 | 0.0 | 0.0 | 0.0 | 0.0 | 0.0 | 0.0 | 0.0 | 0.0 |
| MgO | 11.3 | 13.2 | 14.8 | 7.4 | 11.0 | 14.0 | 11.0 | 16.0 | 17.0 | 15.0 |
| CaO | 0.2 | 2.0 | 0.0 | 3.4 | 0.2 | 4.0 | 3.0 | 4.0 | 4.0 | 1.7 |
| SrO | 7.4 | 6.8 | 2.6 | 7.7 | 7.2 | 2.0 | 3.0 | 2.0 | 2.0 | 4.2 |
| $TiO_2$ | 2.3 | 4.5 | 4.8 | 3.3 | 4.8 | 5.0 | 8.0 | 3.0 | 2.0 | 4.6 |
| $ZrO_2$ | 2.0 | 1.9 | 2.0 | 1.7 | 2.0 | 0.0 | 1.0 | 2.0 | 0.0 | 0.0 |
| $R_2O=Li_2O + Na_2O$ | 21.5 | 19.8 | 22.0 | 22.8 | 21.0 | 21.0 | 17.0 | 22.0 | 25.0 | 19.5 |
| $RO=MgO + CaO + SrO$ | 18.9 | 22.0 | 17.4 | 18.5 | 18.4 | 20.0 | 17.0 | 22.0 | 23.0 | 20.9 |
| $Li_2O/R_2O$ | 0.80 | 0.80 | 0.90 | 0.77 | 0.80 | 0.81 | 0.76 | 0.91 | 0.76 | 0.83 |
| MgO/RO | 0.60 | 0.60 | 0.85 | 0.40 | 0.60 | 0.70 | 0.65 | 0.73 | 0.74 | 0.72 |
| $R_2O/RO$ | 1.14 | 0.90 | 1.26 | 1.23 | 1.14 | 1.05 | 1.00 | 1.00 | 1.09 | 0.93 |
| $Al_2O3/R_2O$ | 0.15 | 0.20 | 0.14 | 0.10 | 0.15 | 0.14 | 0.18 | 0.18 | 0.20 | 0.21 |
| Density (g/cm$^3$) | 2.80 | 2.86 | 2.65 | 2.83 | 2.83 | 2.85 | 2.82 | 2.63 | 2.72 | 2.82 |

TABLE 1-continued

| | | | | | | | | | | |
|---|---|---|---|---|---|---|---|---|---|---|
| Young's modulus (Gpa) | 100 | 105 | 103 | 100 | 100 | 102 | 102 | 107 | 103 | 101 |
| Liquidus temperature (° C.) | 912 | 1119 | 1107 | 906 | 956 | <1000 | 1243 | 1015 | <1000 | <1000 |
| Rate of polishing | 1.8 | 1.7 | 1.5 | 1.2 | 0.8 | 0.9 | 0.8 | 1.6 | 1.7 | 0.9 |

| | Example | | | | |
|---|---|---|---|---|---|
| Item | 11 | 12 | 13 | 14 | 15 |
| $SiO_2$ | 54.8 | 48.0 | 53.5 | 42.0 | 54.0 |
| $Al_2O_3$ | 4.0 | 2.0 | 4.0 | 5.0 | 4.0 |
| $Li_2O$ | 13.2 | 19.0 | 14.2 | 19.0 | 15.0 |
| $Na_2O$ | 3.0 | 6.0 | 2.3 | 6.0 | 5.0 |
| $K_2O$ | 0.0 | 0.0 | 0.0 | 0.0 | 0.0 |
| MgO | 10.0 | 17.0 | 12.0 | 17.0 | 8.0 |
| CaO | 1.0 | 2.0 | 1.0 | 4.0 | 5.0 |
| SrO | 2.0 | 4.0 | 3.0 | 4.0 | 6.0 |
| $TiO_2$ | 10.0 | 1.0 | 8.0 | 3.0 | 3.0 |
| $ZrO_2$ | 2.0 | 1.0 | 2.0 | 0.0 | 0.0 |
| $R_2O=Li_2O + Na_2O$ | 16.2 | 25.0 | 16.5 | 25.0 | 20.0 |
| RO=MgO + CaO + SrO | 13.0 | 23.0 | 16.0 | 25.0 | 19.0 |
| $Li_2O/R_2O$ | 0.81 | 0.76 | 0.86 | 0.76 | 0.75 |
| MgO/RO | 0.77 | 0.74 | 0.75 | 0.68 | 0.42 |
| $R_2O/RO$ | 1.25 | 1.09 | 1.03 | 1.00 | 1.05 |
| $Al_2O_3/R_2O$ | 0.25 | 0.08 | 0.24 | 0.20 | 0.20 |
| Density (g/cm$^3$) | 2.72 | 2.69 | 2.73 | 2.79 | 2.76 |
| Young's modulus (Gpa) | 105 | 101 | 103 | 106 | 100 |
| Liquidus temperature (° C.) | 1153 | <1000 | 1185 | <1000 | <1000 |
| Rate of polishing | 0.8 | 1.9 | 0.8 | 1.8 | 0.8 |

The sample glasses of Examples 1 to 15 were immersed into a melt of an 80:20 mixture of $KNO_3$ and $NaNO_3$ heated at 380° C. for 3 hours to temper the glasses chemically. Each tempered glass was examined with a polarizing microscope to determine the thickness of the resultant compression stress layer. As a result, the tempered sample glasses of Examples 1 to 15 each had a compression stress layer whose thickness is 50 μm or larger. The sample glasses each were thus found to be a composition suitable for tempering.

COMPARATIVE EXAMPLES 1 TO 4

Sample glasses were prepared so as to result in the compositions shown in Table 2 given below, in the same manner as in the Examples.

In Comparative Example 4, however, the batch prepared was melted at 1,600° C. for 16 hours in a platinum crucible and then poured on an iron plate. This glass was held at 650° C. for 30 minutes in an electric furnace. Thereafter, the furnace was switched off to allow the glass to slowly cool to room temperature to obtain a sample glass.

The density, Young's modulus, and liquidus temperature of each of these sample glasses were measured or calculated in the same manners as in the Examples. The results obtained are shown in Table 2.

In Comparative Example 3, however, chemical tempering was conducted by immersing the sample glass for 3 hours in a melt of $KNO_3$ heated at 380° C. Furthermore, in Comparative Example 4, no tempering treatment was done because the glass contained no alkali ingredient.

TABLE 2

| | Comparative Example | | | |
|---|---|---|---|---|
| Item | 1 | 2 | 3 | 4 |
| $SiO_2$ | 65 | 45 | 71.6 | 40 |
| $Al_2O_3$ | 6 | 21 | 0.9 | 15 |
| $Li_2O$ | 2 | 5 | 0 | 0 |

TABLE 2-continued

| | Comparative Example | | | |
|---|---|---|---|---|
| Item | 1 | 2 | 3 | 4 |
| $Na_2O$ | 5 | 10 | 12.7 | 0 |
| $K_2O$ | 0 | 0 | 0.5 | 0 |
| MgO | 10 | 5 | 6 | 25 |
| CaO | 4 | 12 | 8.4 | 10 |
| SrO | 0 | 2 | 0 | 0 |
| $TiO_2$ | 8 | 0 | 0 | 5 |
| $ZrO_2$ | 0 | 0 | 0 | 0 |
| $Y_2O_3$ | 0 | 0 | 0 | 5 |
| $R_2O = Li_2O + Na_2O$ | 7 | 15 | 12.7 | 0 |
| RO = MgO + CaO + SrO | 14 | 19 | 14.4 | 35 |
| $Li_2O/R_2O$ | 0.29 | 0.33 | 0 | — |
| MgO/RO | 0.71 | 0.26 | 0.42 | 0.71 |
| $R_2O/RO$ | 0.5 | 0.79 | 0.88 | 0 |
| $Al_2O_3/R_2O$ | 0.86 | 1.4 | 0.07 | — |
| Density | 2.71 | 2.67 | 2.5 | 3.14 |
| Young's modulus (GPa) | 87 | 90 | 72 | 119 |
| Liquidus temperature (° C.) | 1250< | 1138 | 1040 | 1250< |
| Rate of polishing | 0.6 | 0.5 | 1 | 0.6 |

The sample glasses of Examples 1 to 15 each was cut into a ring shape of an outer diameter of 95 mm and an inner diameter of 25 mm. This disk was ground, polished, subsequently tempered under the same conditions as in the Examples, and then subjected to mirror polishing (surface roughness $R_a$:≦1 nm; JIS B 0601-1994) to regulate the thickness thereof to 1.0 mn. Thus, substrates were obtained.

Chromium, Co—Cr—Ta, and carbon were deposited on these substrates as an undercoat layer, recording layer, and protective layer, respectively, by sputtering method. A lubricating layer was further formed thereon to obtain recording media.

Each of the thus-obtained recording media of Examples was set in a closed type magnetic hard disk drive and continuously rotated at each of 10,000 rpm and 12,000 rpm. As a result, all these recording media were found to be free from troubles such as magnetic head crushing caused by substrate vibration.

The rates of polishing of the sample glasses of Examples 1 to 14 were no less than that of the general soda-lime silicate glass (Comparative Example 3). These results show that mirror polishing is easy in these glass compositions of the present invention. Through a closer investigation, it can be thought that the alkali ingredients, especially $Li_2O$, contribute to improve to the rate of polishing.

The sample glasses of Examples 1 to 15 each had a Young's modulus exceeding 95 GPa and a density lower than 3.0 g/cm$^3$, as shown in Table 1. Furthermore, in most of these glasses, a liquidus temperature is not higher than 1,200° C., showing that they had satisfactory moldability.

The sample glasses of Comparative Examples 1 to 3 each had a Young's modulus of 90 GPa or lower. The sample glass of Comparative Example 3 had a compression stress layer thickness as small as 11 μm, although the chemical tempering process had been conducted at a higher temperature for a longer period than in the Examples. Comparative Example 4 corresponds to the Example 1 given in JP-A-10-81542.

As described above in detail, the following effect is brought about by the present invention.

Since the glass has a preferred composition, it is suitable for mass-production by a continuous process, it can be easily obtained high surface smoothness, and it has a high Young's modulus and a low density.

The preferred modes of the glass composition of the present invention produce the following effects.

When the glass composition has the especially preferred ingredients and the amount, it can have a high Young's modulus and satisfactory devitrification, weathering and acid resistance without fail.

When the glass composition satisfies the relationship $0.75 \leq Li_2O/(Li_2O+Na_2O) \leq 0.95$, it can have, in particular, a high Young's modulus and enhanced acid and weathering resistance, besides the above effects.

When the glass composition satisfies the relationship $0.35 \leq MgO/(MgO+CaO+SrO) \leq 0.85$, it can have an improved Young's modulus, improved devitrification resistance, a lowered liquidus temperature, excellent meltability, and satisfactory producibility, besides the above effects.

When the glass composition satisfies the relationship $(Li_2O+Na_2O)/(MgO+CaO+SrO) \geq 0.90$, it can have a high Young's modulus, satisfactory devitrification and weathering resistance, and satisfactory producibility, besides the above effects.

When the glass composition satisfies the relationship $Al_2O_3/(Li_2O+Na_2O) \leq 0.25$, it can have a high Young's modulus, satisfactory devitrification and weathering resistance, excellent meltability, and satisfactory producibility, besides the above effects.

When the glass composition substantially contains neither $Y_2O_3$ nor any rare-earth oxide, it can be produced at a lower cost and have a low density besides the above effects. This glass composition is suitable for use as a next-generation substrate rotated at a higher speed.

When the glass composition contains substantially no CaO, it retains the intact contents of other components and can have improved meltability and an improved Young's modulus without fail, besides the above effects.

When the glass composition has a liquidus temperature of 1,200° C. or lower, it can have satisfactory productivity, stable quality, a high Young's modulus, and high devitrification and weathering resistance, besides the above effects.

When the glass composition has a Young's modulus of 95 GPa or higher and a density of 3.0 g/cm$^3$ or lower, it can have high rigidity besides the above effects and is suitable for use especially as a substrate. The substrate made of this glass composition resists to bend or is hard to resonate even upon high-speed rotation as compared with substrates made of conventional glasses or aluminum alloys and is effective to reduce the load to spin the disk.

In optical polishing with free abrasive grains, the glass composition has a rate of polishing not lower than that of soda-lime silicate glasses, and it attains high productivity in polishing, besides the above effects.

When the glass composition was immersed into a molten salt containing at least either of potassium ions and sodium ions during an ion exchange treatment, it can have a thick surface compression layer besides the above effects.

According to the process of the present invention, high-quality glass plates of excellent surface flatness can be stably mass-produced because the glass composition is suitable to be formed by the float process.

The information recording medium substrate of the present invention can sufficiently meet quality requirements of the next generation because it comprises the glass composition which has huge merits described above.

The information recording medium of the present invention can reduce flying height because it employs the above substrate.

The information recording device of the present invention can have a larger storage capacity and a shorter access time because it employs the above information recording medium.

What is claimed is:

1. A glass composition comprising, in terms of mol %,
   40 to 55% silicon dioxide ($SiO_2$),
   0.5 to 6% aluminum oxide ($Al_2O_3$),
   2 to 20% lithium oxide ($Li_2O$),
   0 to 10% sodium monoxide (($Na_2O$),
   2 to 30% $R_2O$ ($R_2O=Li_2O+Na_2O$),
   5 to 25% magnesium oxide (MgO),
   0 to 25% calcium oxide (CaO),
   0 to 10% strontium oxide (SrO),
   10 to 40% RO (RO=MgO+CaO+SrO),
   0 to 10% titanium dioxide ($TiO_2$), and
   0 to 5% zirconium oxide ($ZrO_2$),
   wherein the ratio of the content of $Al_2O_3$ to that of ($Li_2O+Na_2O$) is 0.25 or smaller and further wherein the glass composition contains either no yttrium oxide ($Y_2O_3$) or contains $Y_2O_3$ only as an impurity.

2. A glass composition comprising, in terms of mol %,
   45 to 55% silicon dioxide ($SiO_2$),
   0.5 to 5% aluminum oxide ($Al_2O_3$),
   10 to 20% lithium oxide ($Li_2O$),
   2 to 6% sodium monoxide (($Na_2O$),
   15 to 26% $R_2O$ ($R_2O=Li_2O+Na_2O$),
   10 to 17% magnesium oxide (MgO),
   0 to 7% calcium oxide (CaO),
   2 to 8% strontium oxide (SrO),
   12 to 24% RO (RO=MgO+CaO+SrO), 0.5 to 5% titanium dioxide ($TiO_2$), and 0 to 2% zirconium oxide ($ZrO_2$), wherein the ratio of the content of $Al_2O_3$ to that of ($Li_2O+Na_2O$) is 0.25 or smaller and further wherein the glass composition contains either no yttrium oxide ($Y_2O_3$) or contains $Y_2O_3$ only as an impurity.

3. The glass composition of claim 1 or 2, wherein the ratio of the content of $Li_2O$ to that of ($Li_2O+Na_2O$) in terms of mol % is from 0.75 to 0.95.

4. The glass composition of claim 1 or 2, wherein the ratio of the content of MgO to that of (MgO+CaO+SrO) in terms of mol % is from 0.35 to 0.85.

5. The glass composition of claim 1 or 2, wherein the ratio of the content of ($Li_2O+Na_2O$) to that of (MgO+CaO+SrO) in terms of mol % is 0.90 or larger.

6. The glass composition of claim 1 or 2, which contains virtually no rare-earth oxide.

7. The glass composition of claim 1 or 2, which contains virtually no CaO.

8. The glass composition of claim 1 or 2, whose liquidus temperature is 1,200° C. or lower.

9. The glass composition of claim 1 or 2, whose elastic modulus represented by Young's modulus is 95 GPa or higher and whose density is 3.0 g/cm$^3$ or lower.

10. The glass composition of claim 1 or 2, which has a rate of polishing not lower than that of soda-lime silicate glasses in terms of thickness reduction per unit time by the polishing in optical polishing with free abrasive grains.

11. The glass composition of claim 1 or 2, which was immersed into a molten salt containing at least either potassium ions or sodium ions during an ion exchange treatment.

12. A substrate for information recording media which comprises the glass composition of claim 1 or 2.

13. An information recording medium employing the substrate for information recording media of claim 12.

14. An information recording device employing the information recording medium of claim 13.

15. The glass composition of claim 1 or 2, wherein said glass composition is produced by a float process.

* * * * *